(12) United States Patent
Tang et al.

(10) Patent No.: US 7,577,084 B2
(45) Date of Patent: Aug. 18, 2009

(54) ISDN CROSSTALK CANCELLATION IN A DSL SYSTEM

(75) Inventors: Xiangguo Tang, Union City, CA (US); Guozhu Long, Fremont, CA (US); Amir H. Fazlollahi, Pleasanton, CA (US)

(73) Assignee: Ikanos Communications Inc., Fremont, CA (US)

( * ) Notice: Subject to any disclaimer, the term of this patent is extended or adjusted under 35 U.S.C. 154(b) by 799 days.

(21) Appl. No.: 10/836,954

(22) Filed: Apr. 30, 2004

(65) Prior Publication Data

US 2004/0218756 A1 Nov. 4, 2004

Related U.S. Application Data

(60) Provisional application No. 60/467,708, filed on May 3, 2003.

(51) Int. Cl.
*H04J 1/12* (2006.01)

(52) U.S. Cl. ...................... 370/201; 379/417
(58) Field of Classification Search ............. None
See application file for complete search history.

(56) References Cited

U.S. PATENT DOCUMENTS

| | | | |
|---|---|---|---|
| 7,035,361 B2 * | 4/2006 | Kim et al. | 375/350 |
| 7,154,845 B1 * | 12/2006 | Barrass et al. | 370/201 |
| 2003/0086362 A1 * | 5/2003 | Hasegawa et al. | 370/201 |
| 2005/0105473 A1 * | 5/2005 | Hausman et al. | 370/249 |
| 2005/0220180 A1 * | 10/2005 | Barlev et al. | 375/222 |

* cited by examiner

*Primary Examiner*—Kevin C Harper
*Assistant Examiner*—Rhonda Murphy
(74) *Attorney, Agent, or Firm*—IP Creators; Charles C Cary

(57) ABSTRACT

To reduce the ISDN crosstalk in an incoming DSL signal, a crosstalk canceller observes at least a portion of the crosstalk signal and reproduces an estimate of the crosstalk signal for at least a portion of that signal within the DSL band. The crosstalk canceller applies a canceling signal based on the estimated crosstalk signal to reduce the crosstalk in the received DSL signal.

6 Claims, 3 Drawing Sheets

ISDN CROSSTALK CANCELLATION IN A DSL SYSTEM

CROSS REFERENCE TO RELATED APPLICATIONS

This application claims the benefit of U.S. Provisional Application No. 60/467,708, filed May 3, 2003, which is incorporated by reference in its entirety.

BACKGROUND

1. Field of the Invention

This invention relates generally to Digital Subscriber Line (DSL) systems affected by TCM-ISDN crosstalk noise, and in particular to canceling at least some of the TCM-ISDN crosstalk noise.

2. Background of the Invention

Under certain operating conditions, Digital Subscriber Line (DSL) transmissions can be affected by crosstalk interference from other services bundled within a common cable binder. The level of crosstalk generated by other services varies for different cable structures and materials. Some countries, such as Japan and Korea, use telephone cables with a paper-based "pulp" insulator rather than the plastic insulated cables (PIC) used in the United States. These pulp cables have poor insulation and thus cause a high level of crosstalk between different services over copper wires bundled in the same cable binder. Integrated Services Digital Network (ISDN) service is especially troublesome when combined with DSL service, such as Asymmetric DSL (ADSL), because portions of the transmission band for ISDN service overlap portions of the transmission band for DSL service. Like DSL service, ISDN service is deployed widely over copper wires and bundled in the same cable binders as the wires used in DSL service. Because the transmission bands for ISDN and DSL services overlap, ISDN service can cause crosstalk in and interfere with DSL services.

A special system was developed to address this problem where the noisy pulp cables are installed, described in the International Telecommunication Union Telecommunication Standardization Sector (ITU-T) specification G.961 Appendix III. The G.961 Appendix III system reduces crosstalk interference by switch synchronizing ISDN cards at the central office using Time Compression Multiplexing (TCM). TCM provides for ISDN signal transmission and reception during different time periods to reduce near-end crosstalk between ISDN services. ITU-T ADSL standards G.992.1 Annex C and G.992.2 Annex C describe the operation of DSL modems in the presence of TCM-ISDN interference. According to these standards, signal transmissions from DSL modems are switch synchronized to a 400-Hz TCM Timing Reference (TTR) generated at the central office. The TTR signal is the master clock signal for determining when the central office (CO) modem and the customer premises equipment (CPE) modem should transmit and receive ISDN and DSL signals.

Within a particular cable binder, the TCM-ISDN system results in a time-varying noise environment. During the first half period of the TTR signal, the CO modem is dominated by near-end crosstalk (NEXT) interference, and during the second half by far-end crosstalk (FEXT) interference. The reverse is true for the CPE modem. Because FEXT interference is much weaker than NEXT interference and is smaller relative to the received signal, the signal-to-noise ratio (SNR) in the presence of FEXT is higher than in NEXT. Channel capacity and potential data rates are thus higher during FEXT periods and lower during NEXT periods. When the loop is relatively long, in fact, NEXT periods are often unusable due to the TCM-ISDN crosstalk, which may significantly degrade the performance of the DSL transceiver. Accordingly, it is desirable to reduce the noise in a DSL line caused by the TCM-ISDN crosstalk.

SUMMARY OF THE INVENTION

To reduce the TCM-ISDN crosstalk in an incoming DSL signal, a crosstalk canceller estimates the crosstalk signal and cancels at least a portion of the crosstalk in the DSL signal. The crosstalk canceller estimates the TCM-ISDN crosstalk signal on a DSL line by observing at least a portion of the crosstalk signal and reproducing an estimate of the crosstalk signal for at least a portion of that signal within the DSL band. The crosstalk canceller then applies a canceling signal based on the estimated crosstalk signal. In this way, the TCM-ISDN crosstalk signal can be significantly reduced in a DSL system. Reducing the crosstalk signal may allow for an increased data rate, for example, of up to 50% for loops of intermediate length (e.g., 2.5 km to 4 km).

The crosstalk canceller may observe the ISDN signal by receiving an ISDN reference signal, from which information about the ISDN crosstalk in the DSL line can be determined. In one embodiment, the ISDN reference signal is obtained during a training phase of a DSL receiver, where there is only ISDN signal and no DSL signal. In another embodiment, ISDN reference signal is obtained by subtracting an average of a known repetitive DSL signal from the received signal during a training phase of a DSL receiver, in which a repetitive DSL signal coexists with the ISDN signal. In another embodiment, the ISDN reference signal is obtained during an operational phase of the DSL receiver by observing a portion of the ISDN signal in a frequency band in which the DSL signal is turned off. In another embodiment, the ISDN reference signal is obtained during an operational phase of the DSL receiver by increasing the sampling rate of the crosstalk canceller and using portions of the ISDN signal outside the DSL band.

To implement one embodiment of the crosstalk canceller, as little as four FIR filters and two modulators are used, resulting in a crosstalk canceller that is simple from an implementation point of view.

DETAILED DESCRIPTION OF THE PREFERRED EMBODIMENTS

Figure 1:
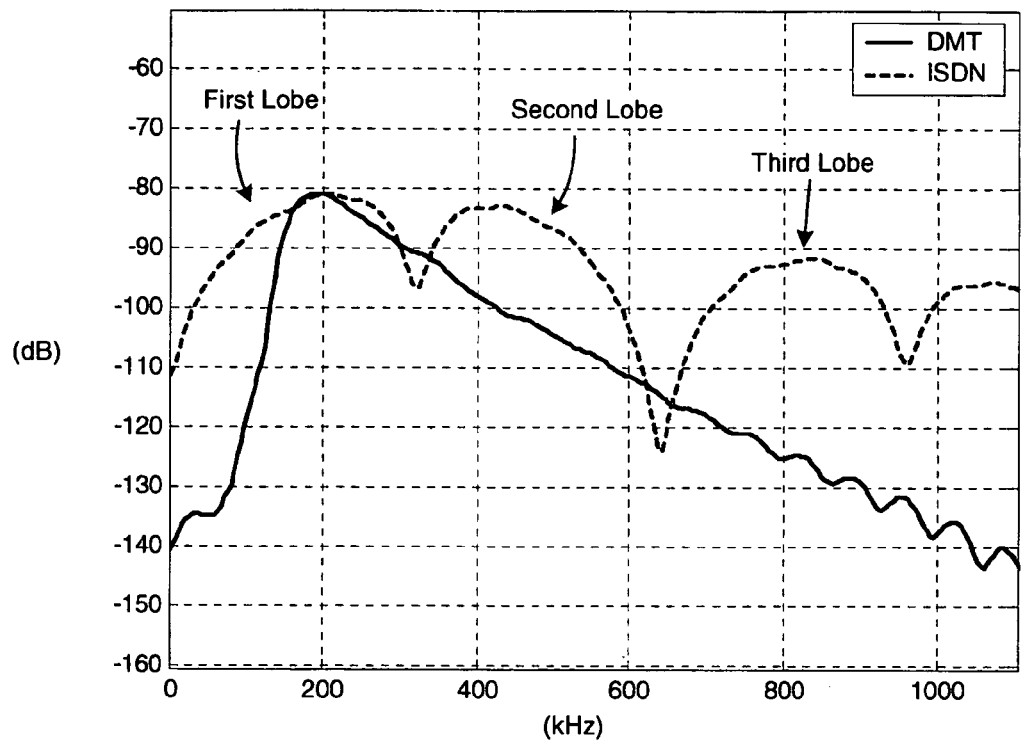
FIG. 1 is a power spectral density (PSD) graph of an example single spectrum ADSL signal using DMT and a TCM-ISDN crosstalk signal, in a typical 3-kilometer Japanese loop, with a receiver sampling rate of 2.208 Msps.

FIG. 1 illustrates a graph of the power spectral density (PSD) for a received single spectrum ADSL downstream signal. As used herein, downstream refers to signal transmission from a central office (CO) to a receiver of customer premises equipment (CPE). Marked as DMT because discrete multi-tone modulation is used, the received ADSL signal is shown by a solid line. In one embodiment of a DSL system, the ADSL signal is within a frequency band of about 138 kHz to about 1.104 MHz. Also shown in FIG. 1 is a typical TCM-ISDN crosstalk signal due to an ISDN service co-bundled in a typical Japanese paper pulp loop with length 3 km, illustrated on the graph by a dotted line. The receiver's sampling rate is 2.208 Msps, allowing it to sample signals up to about half that frequency.

In the example shown in FIG. 1, the TCM-ISDN signal symbol rate is 320 kHz. As the graph shows, this results in a number of "lobes" in the frequency domain of the TCM-ISDN crosstalk signal. The second and further lobes are images of the first lobe due to the modulation scheme used in ISDN services. In a typical ISDN service, each lobe of the crosstalk signal in the PSD graph represents a portion of the crosstalk signal having a width of about 320 kHz. Many lobes of the crosstalk signal exist on the line because typical ISDN transceivers use second-order Butterworth low pass filters, which do not suppress the side lobes (i.e., the images of the main lobe) completely. Because these lobes are strongly correlated, one or more of these lobes of the crosstalk signal can be used to estimate the other lobes. By estimating the other lobes, a canceling signal can be produced to reduce the crosstalk in the DSL signal. For example, the higher-frequency TCM-ISDN lobes (e.g., the third, shown in FIG. 1) to estimate the lower-frequency lobes (e.g., the first and second, shown in FIG. 1) and thus cancel them. The crosstalk estimation and cancellation can be performed in time domain and/or in frequency domain. For example, in a DMT-based DSL receiver, the crosstalk cancellation can be performed before an FFT (i.e., in the time domain) and/or after an FFT (i.e., in the frequency domain).

Figure 2:
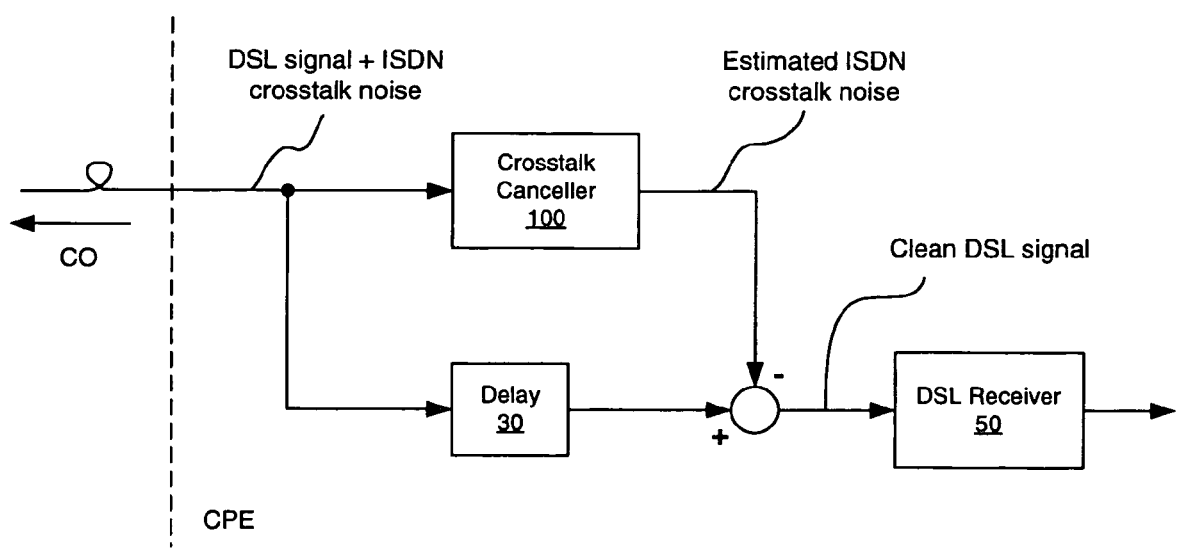
FIG. 2 is a diagram of a DSL receiver system, in accordance with an embodiment of the invention.

FIG. 2 shows a DSL system having a crosstalk canceller 100 in accordance with an embodiment of the invention. At the CPE, the DSL signal having the ISDN crosstalk noise is received. The crosstalk canceller 100 obtains an ISDN reference signal from this signal received on the DSL line and produces an estimated ISDN crosstalk noise signal. This estimated noise signal is then subtracted from the received noisy DSL signal (after passing through a delay 30) to obtain a cleaned DSL signal. The cleaned DSL signal is then used by the DSL receiver 50 in accordance with any known DSL system. In this way, the crosstalk canceller 100 uses the ISDN noise obtainable from the DSL line to estimate and reduce the ISDN crosstalk on the line, thereby increasing the signal-to-noise ration of the system and improving its performance. Although the crosstalk canceller 100 is shown in a CPE system, the systems and methods described herein can also be applied at the CO.

Figure 3:
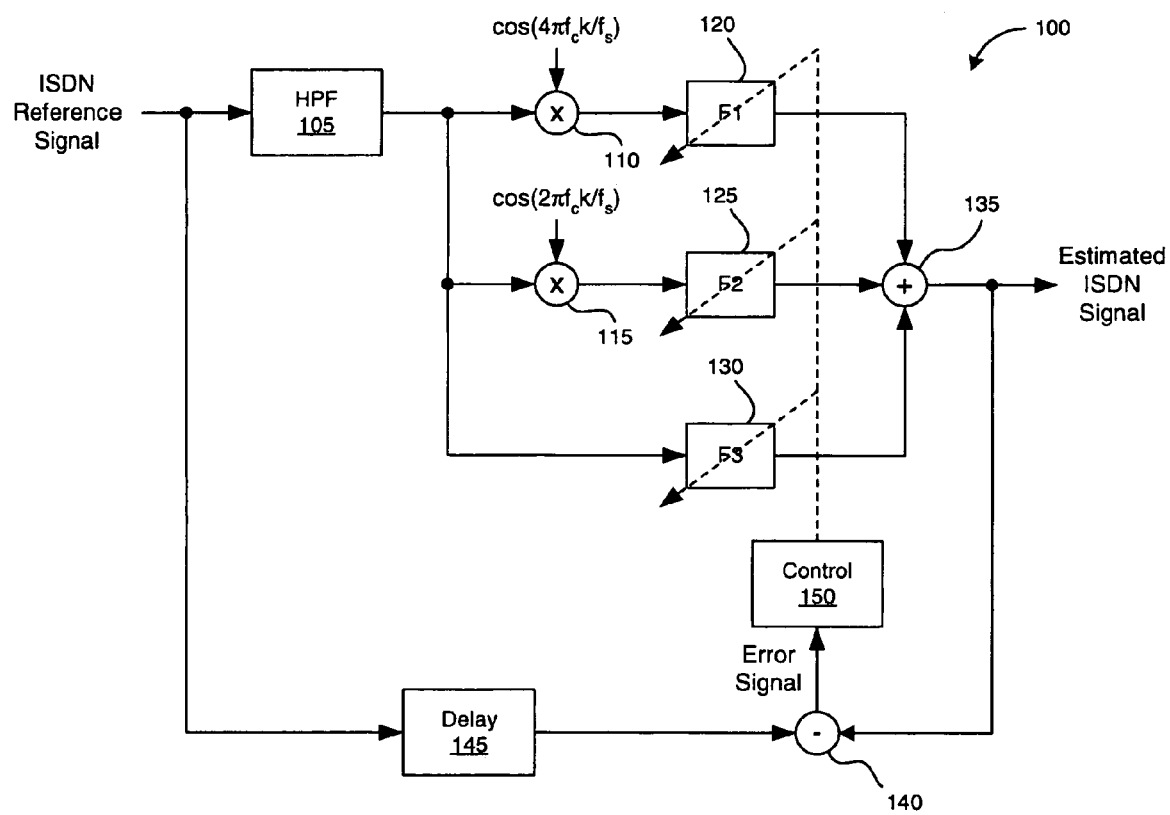
FIG. 3 is a diagram of a TCM-ISDN crosstalk canceller, in accordance with an embodiment of the invention.

FIG. 3 illustrates a crosstalk canceller 100 in accordance with an embodiment of the invention. The crosstalk canceller 100 receives an ISDN reference signal and passes that signal through a high pass filter 105. The high pass filter 105 is configured to filter out a lower frequency band of the ISDN reference signal to obtain a portion of the ISDN signal. For example, in the system graphed in FIG. 1, the high pass filter 105 can be set to have a cutoff frequency of about 640 kHz to remove the first and second lobes from the ISDN reference signal and extract the third and higher lobes from it. In one embodiment, in which the crosstalk canceller 100 is implemented at least in part in the digital domain, the high pass filter 105 is a finite impulse response (FIR) digital filter.

Once the higher frequency lobes are extracted from the ISDN reference signal, the extracted higher frequency lobes are shifted to the position of the first and second lobes. This shifting can be performed by modulators 110 and 115, which shift the reference signal to the positions of the first and second lobes, respectively, of the ISDN crosstalk noise in the DSL signal. In one embodiment, modulator 110 modulates the filtered reference signal with the cosine wave $\cos(4\pi f_c k/f_s)$ to shift to the position of the first lobe, and modulator 115 modulates the filtered reference signal with the cosine wave $\cos(2\pi f_c k/f_s)$ to shift to the position of the second lobe, where $f_c$ is the ISDN symbol rate and $f_s$ is the DMT sampling rate.

The outputs from modulators 110 and 115 and that from filter 105 are then passed through three linear lobe estimation filters, respectively 120, 125, and 130, which reshape the respective ISDN lobes to estimate the first, second, and third lobes, respectively, of the ISDN crosstalk signal on the DSL line. Preferably, the lobe estimation filters 120, 125, and 130 are adjustable filters, and in one embodiment they are FIR digital filters that can receive control inputs to change their coefficients to affect the performance of the filtering and thus of the reshaping of the ISDN lobes. Once reshaped, the lobes are superimposed by an adder block 135 to produce an estimated ISDN crosstalk signal. This estimated signal can then be used to generate a canceling signal to reduce the ISDN crosstalk noise in the DSL signal.

In one embodiment, a feedback path is employed in the crosstalk canceller 100 to improve the accuracy of the estimated ISDN signal. The feedback path can be used to train the lobe estimation filters 120, 125, and 130 to obtain a more accurate estimation of the ISDN signal. An error signal is obtained by taking the difference of the estimated ISDN signal and the ISDN reference signal, for example using a substracter block 140. Before being subtracted from the estimated signal, however, the ISDN reference signal is passed through a delay bock 145 to compensate the delay introduced by the high pass filter 105 and the lobe estimation filters 120, 125, and 130 so that the estimated and reference ISDN signals are compared for the same time period.

The error signal obtained is then passed to a control module 150, which determines how to update the lobe estimation filters 120, 125, and 130 adaptively to improve the estimation of the ISDN crosstalk. Preferably, the control module 150 adjusts the lobe estimation filters 120, 125, and 130 so as to minimize the error signal. In one embodiment, the control module 150 uses LMS or another suitable adaptive filtering algorithm to update the lobe estimation filters 120, 125, and 130 to minimize the error signal. If the lobe estimation filters 120, 125, and 130 are FIR digital filters, the control module 150 can adjust filters 120, 125, and 130 by updating their respective coefficients using the error signal. In the embodiment shown in FIG. 3, the coefficients of filters 120, 125, and 130 are determined using the LMS algorithm according to the following:

$$F_m(i)=F_m(i)+u_m e(k)x_m(k-i),$$

where $F_m(i)$ represents the coefficient i of the lobe estimation filter m; m=1, 2, 3, . . . ; i=0, 1, . . . , $L_m$–1; $L_m$ is the length of the lobe estimation FIR filter m; $u_m$ is the update step size for the lobe estimation filter m; e(k) is the error signal; and $x^m(k-i)$ is the input signal to the lobe estimation filter m.

In operation, the crosstalk canceller 100 is trained and is then used to estimate the ISDN crosstalk signal on the DSL line. The crosstalk canceller 100 shown in FIG. 3 is trained by adjusting the coefficients used in the digital lobe estimation filters 120, 125, and 130. Preferably, although not required, the crosstalk canceller 100 uses a clean ISDN crosstalk signal to train its lobe estimation filters 120, 125, and 130. A clean ISDN crosstalk signal is one having little or no components from the DMT symbols of the DSL signal, at least in the frequency band that the crosstalk canceller 100 uses to estimate the ISDN signal. Before training the lobe estimation filters 120, 125, and 130, it is also desirable to synchronize the receiver with the TTR clock. Training of the crosstalk canceller 100 may be performed during a training mode or during an operational mode (e.g., "show time") of the DSL receiver. In addition, the crosstalk canceller 100 may periodically or continuously retrain itself during the operational mode of the DSL receiver to respond to the slow crosstalk coupling channel variation of the ISDN signal.

To train itself during a training mode of the DSL receiver, the crosstalk canceller 100 can take advantage of the pre-defined periods during the particular training mode. The periods of the training mode vary depending on the type of DSL system in which the crosstalk canceller 100 is to be used. For example, the crosstalk canceller 100 can operate during a training phase as discussed above in a system that complies with ITU-T recommendation G.992.1. In such a system, in one embodiment, the C-REVERB2 period is chosen for training of the crosstalk canceller 100. During the C-REVERB2 period, when the CPE modem is in R-QUIETE3, there is no self-echo coming into the received DSL signal. Because the DMT symbols transmitted during C-REVERB2 are repetitive, the crosstalk canceller 100 can average these received symbols during the FEXT windows to estimate the received DMT signal. The crosstalk canceller 100 then subtracts this estimated DMT signal from the received signal to extract a clean ISDN reference signal. Using this ISDN reference signal, the crosstalk canceller 100 trains its lobe estimation filters 120, 125, and 130 as described above during the NEXT windows.

Based on a similar principle, it is also possible to train the crosstalk canceller 100 during other time periods of the training phase defined in the G.992.1 recommendation. The training based on other DSL recommendations, such as G.992.2 and G.992.3, can operate in a similar manner. For example, an ISDN reference signal in such systems can be estimated at corresponding time periods during the training phase for which there is no self-echo in the received signal, using the averaging technique described above.

During an operational mode of the DSL receiver, it may also be desirable to train and/or retrain the crosstalk canceller 100. As the received symbols are generally not repetitive during operation, it may be difficult to extract a clean ISDN signal as described above for the training phase. However, this problem can be solved using any of a number of techniques. In one embodiment, for example, the whole received signal—including the DSL signal and the ISDN crosstalk—are used as the ISDN reference signal by the crosstalk canceller 100. In so doing, the crosstalk canceller 100 trains its lobe estimation filters 120, 125, and 130 using a reduced adaptation step size (e.g., in the LMS algorithm). This method is suitable to train the crosstalk canceller 100 accurately because the channel variation of the ISDN is slow. In this way, the crosstalk canceller 100 can follow channel changing with reduced adaptation speed.

In another embodiment, the DMT tones within a particular frequency band are turned off, and the crosstalk canceller 100 uses this portion of the incoming DSL signal as the ISDN reference signal. With the DMT tones turned off in this portion, the crosstalk canceller 100 has a clean ISDN signal that can be used to train and estimate the ISDN noise as described above. For example, with reference to FIG. 1, the DMT tones above 640 kHz are turned off. The crosstalk canceller 100 of FIG. 4 can observe a clean third lobe to estimate the first and second lobes. It can be appreciated that turning off particular DMT tones may require coordination with the DSL transceiver at the opposite end of the local loop.

Figure 4:
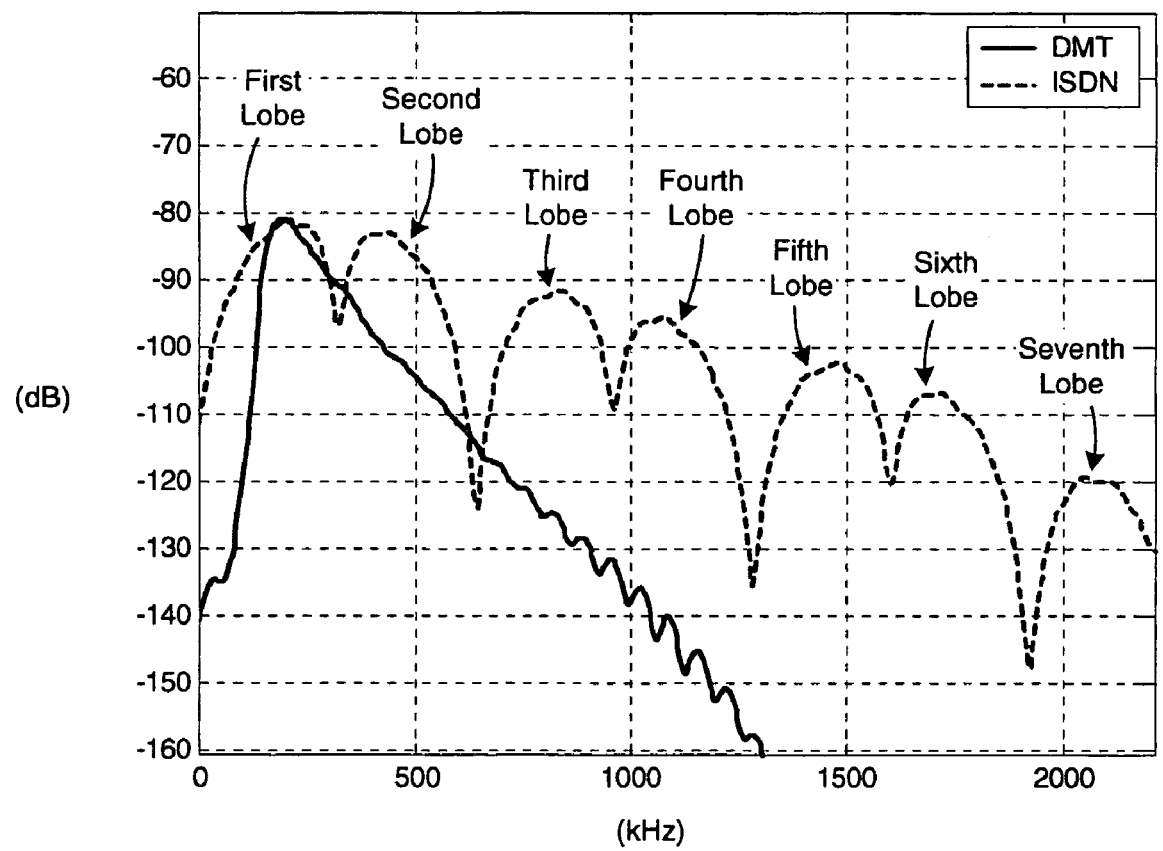
FIG. 4 is a power spectral density (PSD) graph of an example single spectrum ADSL signal using DMT and a TCM-ISDN crosstalk signal, in a typical 3-kilometer Japanese loop, with a receiver sampling rate of 4.416 Msps.

In another embodiment, the DSL receiver increases the sampling rate so it can obtain higher frequency components of the ISDN signal. FIG. 4 illustrates a graph of the power spectral density (PSD) for a received single spectrum ADSL downstream signal wherein the DSL receiver uses a double sampling rate instead of critical sampling rate. In so doing, the receiver can observe more ISDN lobes, such as the fourth through seventh lobes. As shown in FIG. 4, the fifth and sixth lobes are in a frequency band for which the DSL signal is negligible or nonexistent. In this case, for example, the crosstalk canceller 100 uses the fifth and sixth lobes to estimate and cancel the first and second lobes and the third and fourth lobes. Using a pair of lobes (in this case, the fifth and sixth) rather than a single lobe simplifies the design of the crosstalk canceller 100 because it reduces the number of modulators and lobe estimation filters needed (e.g., a modulator and a filter for each pair of lobes instead of for each lobe). In such an embodiment, the cutoff frequency of the high pass filter 105 is set to cut off frequencies below the fifth lobe, and cosine waves input to the modulators 110 and 115 are spread out so as to match the first and second and the third and fourth pairs of lobes. By increasing the sampling rate and using these higher frequency portions of the ISDN signal, the crosstalk canceller 100 can be applied to a wider range of applications (e.g., loop lengths); however, this increased performance may require more processing resources due in part to the increased sampling.

While the crosstalk canceller and method discussed above are discussed in term of a single spectrum ADSL downstream signal, they can be readily applied to other types of DSL systems to cancel or reduce noise from the DSL systems operating in the presence of TCM-ISDN noise. For example, for double spectrum (Annex-I) and quad spectrum (so-called Annex-Q) ADSL downstream signals and equivalently for the upstream signal, the crosstalk canceller and method described above can be used to estimate and cancel the ISDN signal. Moreover, although the crosstalk canceller is described in terms of a digital circuit, it can also be implemented in software (e.g., running on either a general or specific purpose processor) or in analog circuitry.

Any of the steps, operations, or processes described herein can be performed or implemented with one or more software or hardware modules, alone or in combination with other devices, and in the case of hardware with analog or digital circuitry or a combination thereof. It should further be understood that portions of the crosstalk canceller described in terms of particular hardware elements may be implemented with software, and that software elements may be implemented with hardware, such as hard-coded into a dedicated circuit. In one embodiment, a software module is implemented with a computer program product comprising a computer-readable medium containing computer program code, which can be executed by a computer processor for performing the steps, operations, or processes described herein.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

We claim:

1. A method for reducing Integrated Services Digital Network (ISDN) crosstalk in a DSL signal, and the method comprising:
   high pass filtering the ISDN crosstalk to obtain at least one high frequency side lobe thereof over a frequency range of negligible DSL signal strength;
   shifting the at least one high frequency side lobe of the ISDN crosstalk onto at least one lower frequency corresponding to at least one lower frequency side lobe of the LSDN crosstalk within a DSL band; and
   applying a canceling signal, corresponding to the ISDN side lobe shifted in the shifting act, to the DSL signal to substantially cancel the ISDN crosstalk in the DSL signal.

2. The method of claim 1, wherein the shifting act further comprises:
   reshaping the shifted ISDN side lobe based on a strong correlation between side lobes of an ISDN signal.

3. A crosstalk canceller in a DSL system for canceling Integrated Services Digital Network (ISDN) crosstalk in a received DSL signal; and the crosstalk canceller comprising:
   a high pass filter for isolating at least one high frequency side lobe of an ISDN reference signal over a frequency range of negligible DSL signal strength;
   at least one modulator coupled to the high pass filter and configured to shift the isolated at least one high frequency side lobe of the ISDN reference signal onto a lower frequency at which crosstalk from other ISDN side lobes affects the DSL signal;
   at least one reshaping filter coupled to the at least one modulator to reshape the at least one isolated side lobe to correspond to at least one of the other ISDN side lobes the crosstalk from which affects the DSL signal; thereby obtaining an estimated ISDN signal for canceling an ISDN signal component from the received DSL signal based on the strong correlation between side lobes of an ISDN signal.

4. The crosstalk canceller claim 3, further comprising:
   a subtractor for determining an error signal between the ISDN reference signal and the estimated ISDN signal; and
   a control module coupled to the subtractor to receive the error signal, and to adjust the at least one reshaping filters to reduce a magnitude of the error signal.

5. The crosstalk canceller of claim 3, further comprising:
   an other reshaping filter coupled to the high pass filter for adjusting the at least one high frequency side lobe of the ISDN signal; and
   an adder block coupled to the at least one reshaping filter to combine the reshaped ISDN side lobe there from to obtain an estimated ISDN signal, the estimated ISDN signal for canceling an ISDN signal component in the received DSL signal.

6. The crosstalk canceller of claim 3, wherein the at least one modulator modulates the high pass filtered ISDN reference signal with cosine wave corresponding to:

$$\cos 4\pi f_c k/f_s$$

where $f_c$ an ISDN symbol rate and $f_s$ is a DMT sampling rate thereby shifting the isolated at least one high frequency side lobe of the ISDN reference signal onto a lower frequency at which crosstalk from other ISDN side lobes affects the DSL signal.

* * * * *

UNITED STATES PATENT AND TRADEMARK OFFICE
CERTIFICATE OF CORRECTION

PATENT NO. : 7,577,084 B2  Page 1 of 1
APPLICATION NO. : 10/836954
DATED : August 18, 2009
INVENTOR(S) : Xiangguo Tang, Goushu Long and Amir H. Fazlollahi It is certified that error appears in the above-identified patent and that said Letters Patent is hereby corrected as shown below:

Column 7, Claim 1, Line 11 "LSDN" should be corrected to: --ISDN--
Column 8, Claim 4, Line 6 "canceller claim" should be corrected to: --canceller of claim--
Column 8, Claim 4, Line 12 "filters" should be corrected to: --filter--

Signed and Sealed this

Tenth Day of November, 2009

David J. Kappos
*Director of the United States Patent and Trademark Office*